United States Patent
Wang

(10) Patent No.: US 11,173,903 B2
(45) Date of Patent: Nov. 16, 2021

(54) METHOD AND APPARATUS FOR CONTROLLING VEHICLE DRIVING

(71) Applicant: TENCENT TECHNOLOGY (SHENZHEN) COMPANY LIMITED, Shenzhen (CN)

(72) Inventor: Bin Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 197 days.

(21) Appl. No.: 16/576,379

(22) Filed: Sep. 19, 2019

(65) Prior Publication Data

US 2020/0023845 A1 Jan. 23, 2020

Related U.S. Application Data

(63) Continuation of application No. PCT/CN2018/105321, filed on Sep. 12, 2018.

(30) Foreign Application Priority Data

Sep. 12, 2017 (CN) .......................... 201710818341.3

(51) Int. Cl.
- *B60W 30/14* (2006.01)
- *B60W 60/00* (2020.01)
- *B60W 30/095* (2012.01)

(52) U.S. Cl.
CPC ........ *B60W 30/146* (2013.01); *B60W 30/095* (2013.01); *B60W 60/0015* (2020.02);
(Continued)

(58) Field of Classification Search
CPC ............. B60W 30/146; B60W 30/095; B60W 2552/00; B60W 2554/801;
(Continued)

(56) References Cited

U.S. PATENT DOCUMENTS

| 2007/0208485 A1 | 9/2007 | Tamamura et al. |
| 2009/0093938 A1 | 4/2009 | Isaji et al. |

(Continued)

FOREIGN PATENT DOCUMENTS

| CN | 203543948 U | 4/2014 |
| CN | 104299449 A | 1/2015 |

(Continued)

OTHER PUBLICATIONS

Indian Patent Office Examination report for Application No. 201937043565 dated Apr. 5, 2021 6 pages.

(Continued)

*Primary Examiner* — Abby Y Lin
*Assistant Examiner* — Danielle Marie Jackson
(74) *Attorney, Agent, or Firm* — Anova Law Group, PLLC

(57) ABSTRACT

A method and an apparatus for controlling vehicle driving are provided. The method includes: determining, by a computing device according to a speed of a preceding vehicle, a distance between a present vehicle and the preceding vehicle, and a preset expected collision time, a speed limit imposed by the preceding vehicle on the present vehicle; and determining a road-condition-related speed limit on the present vehicle according to road attribute information of a current location of the present vehicle. The method also includes determining, by the computing device, a comprehensive speed limit on the present vehicle according to the speed limit imposed by the preceding vehicle on the present vehicle and the road-condition-related speed limit; and generating, by the computing device, a driving control signal for the present vehicle based on the comprehensive speed limit.

18 Claims, 4 Drawing Sheets

Determine, according to a speed of a preceding vehicle, a distance between a present vehicle and the preceding vehicle, and a preset expected collision time, a speed limit imposed by the preceding vehicle on the present vehicle; and determine a road-condition-related speed limit on the present vehicle according to road attribute information of a current location of the present vehicle Determine a comprehensive speed limit on the current vehicle according to the speed limit imposed by the preceding vehicle on the present vehicle and the road-condition-related speed limit Control driving based on the comprehensive speed limit

(52) U.S. Cl.
CPC ..... *B60W 2520/10* (2013.01); *B60W 2552/00* (2020.02); *B60W 2554/801* (2020.02); *B60W 2554/804* (2020.02); *B60W 2555/60* (2020.02); *B60W 2720/10* (2013.01)

(58) Field of Classification Search
CPC ....... B60W 2554/804; B60W 2555/60; B60W 2520/10; B60W 2720/10; B60W 2554/802; B60W 2554/4042; B60W 2554/4041; B60W 30/16; B60W 30/162; B60W 30/14; B60W 30/09; B60W 2552/30; B60W 30/143
See application file for complete search history.

(56) References Cited

U.S. PATENT DOCUMENTS

| | | |
|---|---|---|
| 2012/0083987 A1 | 4/2012 | Schwindt et al. |
| 2013/0041567 A1* | 2/2013 | Yamashiro ............ B60W 30/16 701/96 |
| 2014/0058579 A1 | 2/2014 | Ono |
| 2014/0219510 A1 | 8/2014 | Nagaoka et al. |
| 2016/0107644 A1 | 4/2016 | Eigel |
| 2016/0339782 A1 | 11/2016 | Seong et al. |
| 2016/0339913 A1 | 11/2016 | Yamashita et al. |
| 2017/0057355 A1 | 3/2017 | Oikawa et al. |
| 2017/0068249 A1 | 3/2017 | Minowa et al. |
| 2017/0072955 A1 | 3/2017 | Ediger et al. |
| 2017/0166172 A1 | 6/2017 | Kwon et al. |
| 2018/0001892 A1* | 1/2018 | Kim ..................... B60W 30/16 |

FOREIGN PATENT DOCUMENTS

| | | |
|---|---|---|
| CN | 104627176 A | 5/2015 |
| CN | 104670191 A | 6/2015 |
| CN | 104742903 A | 7/2015 |
| CN | 105346541 A | 2/2016 |
| CN | 105513427 A | 4/2016 |
| CN | 105774807 A | 7/2016 |
| CN | 106166954 A | 11/2016 |
| CN | 106476805 A | 3/2017 |
| CN | 106515734 A | 3/2017 |
| CN | 106541941 A | 3/2017 |
| CN | 106882172 A | 6/2017 |
| CN | 108284833 A | 7/2018 |
| DE | 102007038059 A1 | 2/2009 |
| EP | 1900586 A2 | 3/2008 |
| JP | 2005173909 A | 6/2005 |
| JP | 2007145095 A | 6/2007 |
| JP | 2007230440 A | 9/2007 |
| JP | 2008162564 A | 7/2008 |
| JP | 2009029343 A | 2/2009 |
| JP | 2010282508 A | 12/2010 |
| JP | 2012162221 A | 8/2012 |
| JP | 2015018447 A | 1/2015 |
| JP | 2015063245 A | 4/2015 |
| JP | 2015170126 A | 9/2015 |
| JP | 2016215917 A | 12/2016 |
| JP | 2017043171 A | 3/2017 |
| WO | 2013099391 A1 | 7/2013 |
| WO | 2016051524 A1 | 4/2016 |

OTHER PUBLICATIONS

The Japan Patent Office (JPO) Notification of Reasons for Refusal for Application No. 2019-556906 and Translation dated Dec. 15, 2020 20 Pages.
The World Intellectual Property Organization (WIPO) International Search Report for PCT/CN2018/105321 dated Dec. 19, 2018 6 Pages (including translation).
The State Intellectual Property Office of the People's Republic of China (SIPO) Office Action 1 for 201710818341.3 dated Apr. 15, 2019 12 Pages (including translation).
Korean Intellectual Property Office (KIPO) Office Action 1 for 20197034363 dated Dec. 1, 2020 12 Pages (including translation).

* cited by examiner

METHOD AND APPARATUS FOR CONTROLLING VEHICLE DRIVING

CROSS-REFERENCES TO RELATED APPLICATIONS

This application is a continuation application of PCT Patent Application No. PCT/CN2018/105321, filed on Sep. 12, 2018, which claims priority to China Patent Application No. 201710818341.3, filed with the Chinese Patent Office on Sep. 12, 2017 and entitled "METHOD AND APPARATUS FOR CONTROLLING VEHICLE DRIVING", the entire contents of both of which are incorporated herein by reference.

FIELD OF TECHNOLOGY

This application relates to the field of intelligent transportation, and in particular, to a method and an apparatus for controlling vehicle driving.

BACKGROUND OF THE DISCLOSURE

With the development of the field of intelligent transportation, autonomous vehicles, such as self-driving cars and cars with advanced driver assistance system (ADAS), gradually become a part of people's life. When an autonomous vehicle is operating, related information of a current road, such as a wet road surface or a road section near a school, may be obtained by using a navigation system. A comprehensive speed limit is calculated according to the related information of the current road. Then, a current speed of the autonomous vehicle is constantly controlled to be less than the comprehensive speed limit.

During implementation of this application, the inventor finds that the related technology at least has the following problem: When a vehicle calculates a comprehensive speed limit, factors taken into consideration are excessively simple. As a result, the calculated comprehensive speed limit is not applicable to complex situations during driving, thus lowering driving safety.

SUMMARY

In order to resolve the problem in the related technology, embodiments of this application provide a method and an apparatus for controlling vehicle driving. The technical solutions are as follows:

According to one aspect of the embodiments of this application, a method for controlling vehicle driving is provided. The method includes determining, by a computing device according to a speed of a preceding vehicle, a distance between a present vehicle and the preceding vehicle, and a preset expected collision time, a speed limit imposed by the preceding vehicle on the present vehicle; and determining a road-condition-related speed limit on the present vehicle according to road attribute information of a current location of the present vehicle. The method also includes determining, by the computing device, a comprehensive speed limit on the present vehicle according to the speed limit imposed by the preceding vehicle on the present vehicle and the road-condition-related speed limit; and generating, by the computing device, a driving control signal for the present vehicle based on the comprehensive speed limit.

According to another aspect of the embodiments of this application, a terminal is provided, the terminal including a processor and a memory. The processor is configured to: determine, according to a speed of a preceding vehicle, a distance between a present vehicle and the preceding vehicle, and a preset expected collision time, a speed limit imposed by the preceding vehicle on the present vehicle; and determine a road-condition-related speed limit on the present vehicle according to road attribute information of a current location of the present vehicle. The processor is also configured to determine a comprehensive speed limit on the present vehicle according to the speed limit imposed by the preceding vehicle on the present vehicle and the road-condition-related speed limit; and generate a driving control signal for the present vehicle based on the comprehensive speed limit.

According to another aspect of the embodiments of this application, a non-transitory computer readable storage medium is provided, the storage medium storing at least one instruction, and the instruction being loaded and executed by a processor to implement: determining, according to a speed of a preceding vehicle, a distance between a present vehicle and the preceding vehicle, and a preset expected collision time, a speed limit imposed by the preceding vehicle on the present vehicle; and determining a road-condition-related speed limit on the present vehicle according to road attribute information of a current location of the present vehicle; determining a comprehensive speed limit on the present vehicle according to the speed limit imposed by the preceding vehicle on the present vehicle and the road-condition-related speed limit; and generating a driving control signal for the present vehicle based on the comprehensive speed limit.

The technical solutions provided in the embodiments of this application achieve the following beneficial effects:

In the embodiments of this application, during calculation of a comprehensive speed limit, factors taken into consideration are more comprehensive, which is more applicable to complex situations during driving, so that driving safety is improved.

It is to be appreciated that, the general description above and the detailed description in the following are merely exemplary and illustrative, and cannot limit this application.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description merely show some embodiments of this application, and a person of ordinary skill in the art may still derive other drawings from these accompanying drawings without creative efforts.

Figure 1:
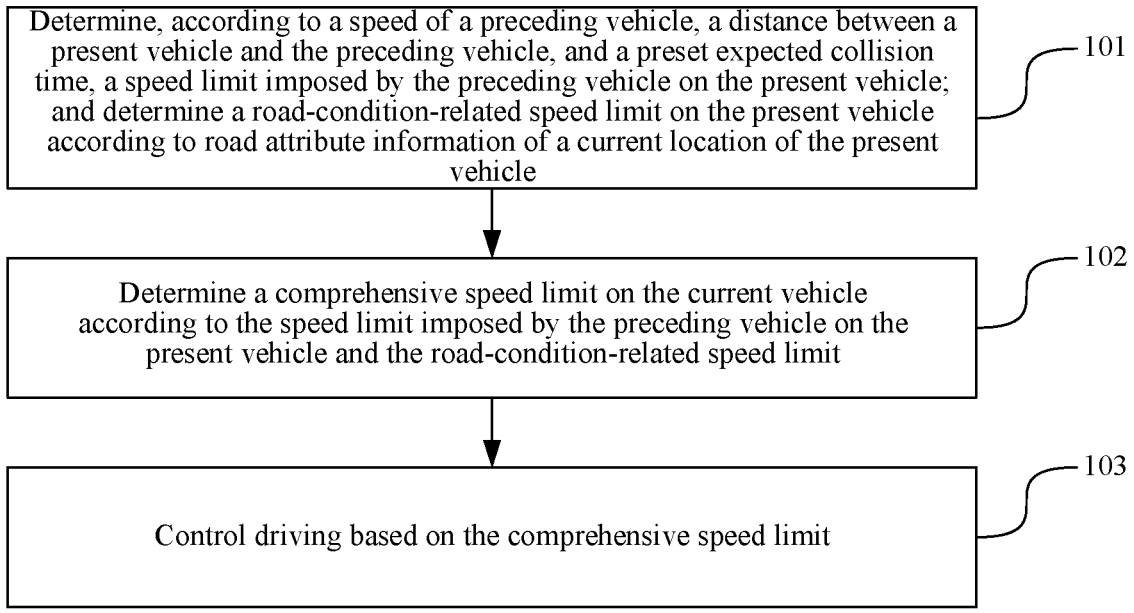
FIG. 1 is a flowchart of a method for controlling vehicle driving according to an embodiment of this application.

The embodiments stated in the embodiments of this application are shown in the foregoing accompanying drawings, and a further detailed description is provided in the following. The accompanying drawings and the text description are not intended to limit the scope of the conception of this application in any manner, but are intended to illustrate the concept of this application for a person skilled in the art with reference to specific embodiments.

DESCRIPTION OF EMBODIMENTS

To make the objectives, technical solutions, and advantages of this application clearer, the following describes implementations of this application in further detail with reference to the accompanying drawings.

An embodiment of this application provides a method for controlling vehicle driving. The method may be implemented by a terminal. The terminal may have a built-in distance detection apparatus, navigation and positioning apparatus, or the like. The terminal may be a device having an autonomous driving capability, or may be a terminal mounted on a device having an autonomous driving capability. In some embodiments, the terminal being a vehicle-mounted terminal is used as an example to describe the solution in detail; other situations are similar thereto, and are not described in detail again in this embodiment.

The terminal may include components such as a processor and a memory. The processor may be a central processing unit (CPU), and may be configured to perform processing such as determining whether a signal meets a preset trigger condition or receiving an instruction. In some embodiments of this application, the processor may detect current lane information of a present vehicle (current vehicle), calculate speed limits on the present vehicle in different cases, and the like. The memory may be a random access memory (RAM), a flash memory, or the like, and may be configured to store received data, process data required in a procedure, and process data generated in the procedure. In some embodiments of this application, the memory may store a speed of a preceding vehicle, a distance between the present vehicle and the preceding vehicle, a preset expected collision time, different speed limits calculated by the processor, a finally determined comprehensive speed limit on the present vehicle, and the like.

The terminal may further include a screen, a transceiver, an image detection component, an audio output component, an audio input component, and the like. The screen may be a touchscreen, and may be configured to display state information and a control page, and may be further configured to detect a touch signal. In some embodiments of this application, the screen may display vehicle state information such as a speed of the present vehicle, a road condition of a current lane, and control buttons such as a lane changing button and a steering button. The transceiver may be configured to perform data transmission with other devices. For example, the transceiver receives a device list and a control page sent by a server, and may include an antenna, a matching circuit, and a modem. The image detection component may be a camera. The audio output component may be a loudspeaker, a headset, or the like. The audio input component may be a microphone, or the like.

As shown in FIG. 1, a processing procedure of the method may include the following steps (e.g., implemented by a computing device such as a driving control unit/processor):

In step 101, a speed limit imposed by a preceding vehicle on a present vehicle is determined according to a speed of the preceding vehicle, a distance between the present vehicle and the preceding vehicle, and a preset expected collision time, and a road-condition-related speed limit on the present vehicle are determined according to road attribute information of a current location of the present vehicle. The preceding vehicle, as used herein, generally refers to a vehicle in front of at least a portion of the present vehicle. The preceding vehicle may be in the same lane as the present vehicle. The distance between the preceding vehicle and the present vehicle may refer to a driving distance between the two vehicles. For example, if the two vehicles are driving on a curved road or turning on a corner, the driving distance is longer than the straight-line distance. The road-condition related speed limit, as used herein, may also be referred to as other speed limits.

The speed limit imposed by the preceding vehicle on the present vehicle and other speed limits are upper speed limits that are calculated based on different conditions respectively. The preceding vehicle is a vehicle that is in a preset distance range in front of the present vehicle and that is closest to the present vehicle. The preset distance range may be a range of being less than a distance a, and the value of a may be between 100 and 200 meters, for example, 150 meters.

In implementation, when a vehicle runs, a vehicle-mounted terminal on the vehicle performs positioning detection according to a preset cycle, calculates speed limits on the present vehicle according to various pieces of information obtained through positioning detection, and uses a finally obtained speed limit as a basis for formulating an actual speed plan. Duration of the preset cycle may range from 0.05 to 0.2 s, for example 0.1 s.

When the vehicle-mounted terminal detects, by using the distance detection apparatus, that there is another vehicle running in front of the present vehicle, and the vehicle is in the preset distance range in front of the present vehicle and is closest to the present vehicle, the vehicle is determined as a preceding vehicle. The vehicle-mounted terminal obtains information such as a speed of the preceding vehicle, a distance between the present vehicle and the preceding vehicle, and a preset expected collision time, and calculates, according to a preset algorithm, a speed limit imposed by the preceding vehicle on the present vehicle. The preset algorithm is specifically illustrated in the following.

The vehicle-mounted terminal may further obtain road attribute information of a current location of the present vehicle, and determine other speed limits on the present vehicle according to the road attribute information.

Optionally, there are multiple solutions for calculating, according to the speed of the preceding vehicle, the speed limit imposed by the preceding vehicle on the present vehicle. Several feasible solutions are provided below:

Solution 1: The speed limit imposed by the preceding vehicle on the present vehicle is determined according to the speed of the preceding vehicle, the distance between the present vehicle and the preceding vehicle, and the preset expected collision time.

The preset expected collision time is a minimum value of an expected collision time required to avoid an accident, and the value is preset by technical personnel. The expected collision time is duration it takes for the present vehicle to collide with the preceding vehicle while the preceding vehicle and the present vehicle do not change the speeds. The expected collision time may be obtained by technical personnel through multiple tests, and is generally determined by a reaction speed of a driver.

In implementation, the speed limit imposed by the preceding vehicle on the present vehicle may be calculated according to the following formula (1):

$$vLimit_5 = v_q + d/t_{lc} \tag{1}$$

In the formula, vLimit$_5$ represents a speed limit imposed by a preceding vehicle on a present vehicle, v$_q$ represents a speed of the preceding vehicle, d represents a distance between the present vehicle and the preceding vehicle, t$_{lc}$ represents an expected collision time, and it is generally set that t$_{lc}$=6.0 s. Calculated vLimit$_5$ is determined as the speed limit imposed by the preceding vehicle on the present vehicle.

Solution 2: A first speed limit on the present vehicle is determined according to the speed of the preceding vehicle, the distance between the present vehicle and the preceding vehicle, and the preset expected collision time; a second speed limit on the present vehicle is determined according to the speed of the preceding vehicle, the distance between the present vehicle and the preceding vehicle, a preset safe distance between the present vehicle and the preceding vehicle, preset driving duration required for adjusting the distance between the present vehicle and the preceding vehicle to be the safe distance, and a preset acceleration time; if the speed of the preceding vehicle is not less than a speed of the present vehicle, a minimum value in the first speed limit and the second speed limit is determined as the speed limit imposed by the preceding vehicle on the present vehicle; if the speed of the preceding vehicle is less than the speed of the present vehicle, a maximum value in the first speed limit and the second speed limit is determined as the speed limit imposed by the preceding vehicle on the present vehicle.

In implementation, two speed limits: the first speed limit and the second speed limit, are used as intermediate quantities in this solution, and the final speed limit imposed by the preceding vehicle on the present vehicle is determined based on the two intermediate quantities.

First, a calculation method of the first speed limit in this solution is the same as that of the speed limit imposed by the preceding vehicle on the present vehicle in the foregoing solution 1. Processing may be performed with reference to the step in solution 1, to obtain the first speed limit.

Then, an acceleration upper limit a$_{limit}$ for adjusting the distance between the present vehicle and the preceding vehicle to be the safe distance is first calculated according to the following formula (2):

$$a_{limit} = a + a_{add} \quad (2)$$

$$a = \frac{2 \times (d - d_s)}{t_d \times t_d} + \frac{2 \times (v_q - v_s)}{t_d} \quad (3)$$

In the formula, a$_{limit}$ represents an acceleration upper limit, and a$_{add}$ represents a manually set adjustment value. The acceleration upper limit may be tuned based on different acceleration upper limits, and it may be set that a$_{add}$=0.2 m/s$^2$. a represents an acceleration for adjusting a distance between a present vehicle and a preceding vehicle to be a safe distance within duration t$_d$. Generally, a value range of a is [−4, 1.5]. If it is calculated through the foregoing formula (3) that a is greater than a maximum value in the value range, the value of a is modified to be the maximum value in the value range. If it is calculated through the foregoing formula (3) that a is less than a minimum value in the value range, the value of a is modified to be the minimum value. d represents the distance between the present vehicle and the preceding vehicle, and d$_s$ is the preset safe distance between the present vehicle and the preceding vehicle. d$_s$ may be calculated according to d$_s$=v$_s$×t$_m$, where v$_s$ represents a speed of the present vehicle, and t$_m$ is a system parameter. During setting of a specific value, it may be set by default that t$_m$=3 s in consideration of an onset time of vehicle braking. t$_d$ represents preset driving duration required for adjusting the distance between the present vehicle and the preceding vehicle to be the safe distance. During setting of a specific value, it may be generally set that t$_d$=3.0 s according to an acceleration requirement of a vehicle type. v$_q$ represents a speed of the preceding vehicle.

According to the calculated acceleration upper limit a$_{limit}$, the second speed limit on the present vehicle is calculated based on formula (4):

$$vLimit_6 = v_s + a_{limit} \times t_a \quad (4)$$

In the formula, vLimit$_6$ represents a second speed limit on a present vehicle, v$_s$ represents a speed of the present vehicle, a$_{limit}$ represents an acceleration upper limit calculated through the foregoing step, and t$_a$ represents a preset acceleration time, where in consideration of an acceleration time requirement of a vehicle type, a specific value may be generally set as follows: t$_a$=1.5 s.

Finally, after the first speed limit and the second speed limit are calculated, the speed of the preceding vehicle is compared with the speed of the present vehicle. If the speed of the preceding vehicle is not less than the speed of the present vehicle, a minimum value between the two speeds is determined as the speed limit imposed by the preceding vehicle on the present vehicle. If the speed of the preceding vehicle is less than the speed of the present vehicle, a maximum value between the two speeds is determined as the speed limit imposed by the preceding vehicle on the present vehicle.

When obtaining the road attribute information of the current location, the vehicle-mounted terminal calculates multiple different speed limits according to different road attribute information, and the multiple different speed limits are collectively referred to as other speed limits.

Optionally, there is a wide variety of road attribute information, and there are also various other speed limits, which may include a lane-imposed speed limit on the present vehicle (e.g., speed limit of the lane where the vehicle is running), a corner-imposed speed limit on the present vehicle, and a road-type-imposed speed limit on the present vehicle. Processing for determining other speed limits are described below by using these cases as examples:

Case 1: When the other speed limits include a lane-imposed speed limit on the present vehicle, the determining other speed limits on the present vehicle according to road attribute information of a current location includes: determining a speed limit of a current lane as the lane-imposed speed limit on the present vehicle.

One road may include one or more lanes, and a lane to which the current location belongs is a current lane on which the present vehicle is running among several lanes of a current road.

In implementation, the vehicle-mounted terminal may obtain an electronic map through the navigation and positioning apparatus, determines a location of the present vehicle on the electronic map, determines a specific lane of a road that the present vehicle is running on, and obtains a speed limit of the lane where the present vehicle is located. The speed limit is set by a traffic management department according to a condition of the current lane. For example, on a three-lane expressway, a speed limit of the left lane is 120 km/h, a speed limit of the middle lane is 100 km/h, and a speed limit of the right lane is 80 km/h. The vehicle-mounted terminal determines, by using the navigation and positioning apparatus, that the present vehicle is running on the middle lane among the three lanes, and therefore can determine that the speed limit on the present vehicle on the lane is 100 km/h, thereby determining the speed limit as the lane-imposed speed limit on the present vehicle.

Optionally, when the present vehicle has a lane change, to ensure traffic safety, it may be controlled that the lane-imposed speed limit on the present vehicle is not reduced within particular duration. Corresponding processing may be as follows: determining the speed limit of the current lane as the lane-imposed speed limit on the present vehicle when the present vehicle does not have a lane change within preset duration before the current moment; determining the speed limit of the current lane as the lane-imposed speed limit on the present vehicle when the present vehicle has a lane change within the preset duration before the current moment and the speed limit of the current lane is not less than a speed limit of a lane before the lane change to the current lane; and when the present vehicle has a lane change within the preset duration before the current moment and the speed limit of the current lane is less than the speed limit of the lane before the lane change to the current lane, determining the speed limit of the lane before the lane change as the lane-imposed speed limit on the present vehicle.

The preset duration may be preset by technical personnel in the vehicle-mounted terminal. A specific value may be set according to a general reaction speed of a driver of a car behind, and generally may be set to 5 seconds.

In implementation, the vehicle-mounted terminal may obtain lane changing information of the vehicle through a behavior of a driver, such as pressing a lane changing button manually. Alternatively, the lane changing information may be detected by using the navigation and positioning apparatus during cyclic detection. When the vehicle-mounted terminal performs detection cyclically, a lane where the present vehicle is located is determined in each cycle, and the lane in the current cycle is compared with a lane in each cycle within previous preset duration, so as to determine whether a lane change occurs within the previous preset duration. If all the lanes of the present vehicle in the cycles within the preset duration are the same as the current lane, it indicates that the present vehicle does not have a lane change within the period of time, and the speed limit of the current lane is determined as the lane-imposed speed limit on the present vehicle.

Figure 2:
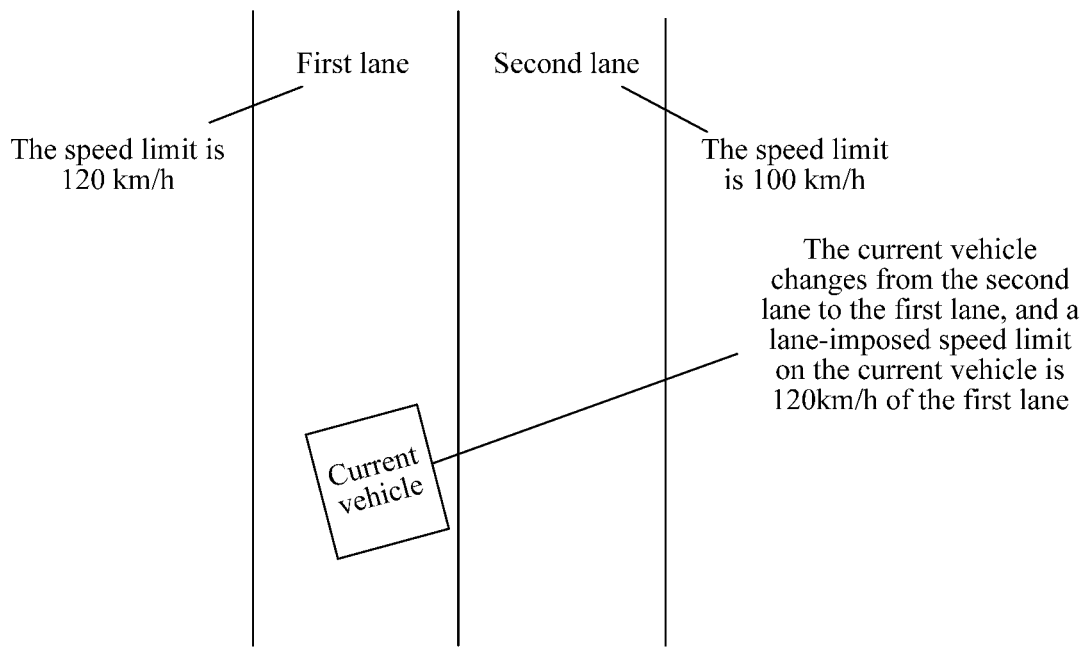
FIG. 2 is a schematic diagram of a lane changing scenario of a vehicle according to an embodiment of this application.

If there is a lane corresponding to at least one cycle within the preset duration is different from the current lane, it may be considered that the present vehicle has a lane change. In this case, if a speed limit of a lane after the lane change is not less than a speed limit of a lane before the lane change, as shown in FIG. 2, the speed limit of the lane after the lane change (that is, the speed limit of the current lane) is determined as the lane-imposed speed limit on the present vehicle. No matter whether the present vehicle has one lane change or multiple lane changes, processing is performed according to the foregoing processing method.

Figure 3:
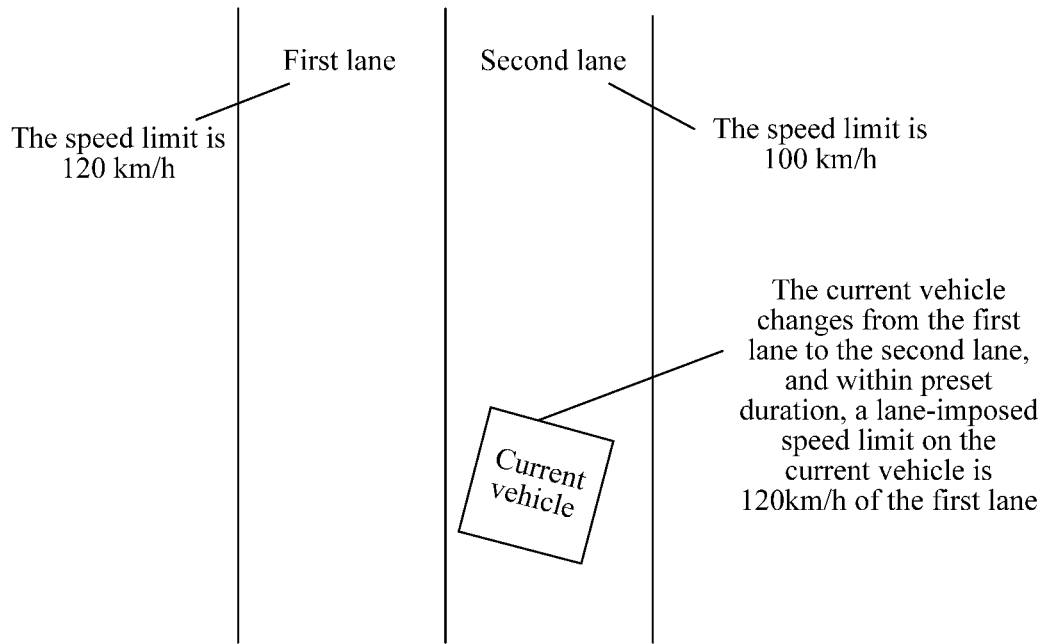
FIG. 3 is a schematic diagram of a lane changing scenario of a vehicle according to an embodiment of this application.

If there is a lane corresponding to at least one cycle within the preset duration is different from the current lane, it may be considered that the present vehicle has a lane change. If it is detected that the present vehicle has one lane change and a speed limit after the lane change is less than a speed limit of a lane before the lane change, as shown in FIG. 3, the speed limit of the lane before the lane change is determined as the lane-imposed speed limit on the present vehicle. If it is detected that the present vehicle has multiple lane changes, and a speed limit after each lane change is less than a speed limit of a lane before the lane change, a speed limit of a lane before the last lane change is determined as the lane-imposed speed limit on the present vehicle.

The foregoing case of detecting that the present vehicle does not have a lane change within the preset duration before the current moment implies a condition that the vehicle-mounted terminal does not receive a lane changing instruction in the current cycle. That is, the foregoing processing may be as follows: determining the speed limit of the current lane as the lane-imposed speed limit on the present vehicle when the present vehicle does not have a lane change within the preset duration before the current moment and no lane changing instruction is received at the current moment.

In addition, based on the foregoing processing, if the vehicle-mounted terminal receives a lane changing instruction in the current cycle, the following special processing is performed: If a lane changing instruction is received in the current cycle and the speed limit of the current lane is less than a speed limit of a lane that the present vehicle is going to enter, the speed limit of the lane that the present vehicle is going to enter is determined as the lane-imposed speed limit on the present vehicle. When the present vehicle does not have a lane change within the preset duration before the current moment, a lane changing instruction is received at the current moment, and the speed limit of the current lane is not less than a speed limit of a lane that the present vehicle is going to enter, the speed limit of the current lane is determined as the lane-imposed speed limit on the present vehicle.

Based on the foregoing processing, when the vehicle switches from a low-speed lane to a high-speed lane, the lane-imposed speed limit on the present vehicle can be improved in advance after a lane changing instruction is received and before an actual lane change occurs based on the lane changing instruction, so that the vehicle can switch to the high-speed lane in an accelerated manner. If the vehicle switches from a high-speed lane to a low-speed lane, the speed limit imposed by the current lane on the present vehicle can be maintained after a lane changing instruction is received and before an actual lane change occurs based on the lane changing instruction, so that the vehicle changes the lane in an accelerated manner.

Case 2: When the other speed limits include a corner-imposed speed limit on the present vehicle, the determining other speed limits on the present vehicle according to road attribute information of a current location includes: determining the corner-imposed speed limit on the present vehicle according to a road curvature of the current location.

Figure 4:
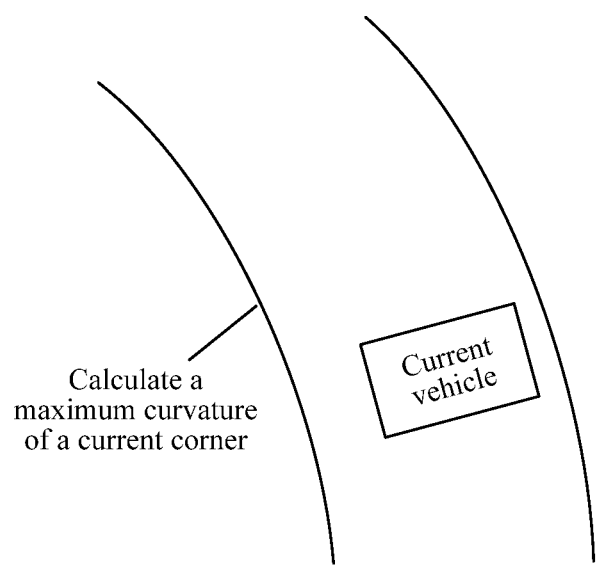
FIG. 4 is a schematic diagram of a scenario where a vehicle runs at a corner according to an embodiment of this application.

In implementation, the vehicle-mounted terminal determines, according to the location of the present vehicle on the electronic map, that the present vehicle is in a corner currently, as shown in FIG. 4. In this case, the vehicle-mounted terminal samples the current corner by using the navigation and positioning apparatus, calculates a maximum curvature k of the current corner, and calculates, according to the calculated curvature k, the corner-imposed speed limit on the present vehicle based on the following formula (5):

$$\text{vLimit\_k} = \sqrt{\frac{u \times g}{|k|}} \qquad (5)$$

vLimit_k represents a corner-imposed speed limit on a present vehicle; k represents a maximum curvature of a current corner, and a specific value is determined by means of sampling through the navigation and positioning apparatus of the vehicle-mounted terminal; u is a cornering ratio, which may be preset by technical personnel, and a specific value may be set with reference to average bending of general corners. The vehicle-mounted terminal of the present vehicle may set by default that u=0.2. g represents acceleration of gravity, and g=9.8 m/s$^2$.

After the speed limit imposed by the corner on the present vehicle is calculated, when the vehicle runs on the corner, the speed is determined as the corner-imposed speed limit on the present vehicle.

Case 3: when the other speed limits include a road-type-imposed speed limit on the present vehicle, the determining other speed limits on the present vehicle according to road attribute information of a current location includes: determining the road-type-imposed speed limit on the present vehicle according to a road type of the current location and a pre-stored correspondence between road types and speed limits.

In implementation, when the vehicle runs on different types of roads, speed limits for the present vehicle are also different. Speed limits corresponding to various types of roads are stipulated in traffic laws. A correspondence between various road types and speed limits may be stored in the vehicle-mounted terminal in a form of a correspondence table, as shown in Table 1.

TABLE 1

| Road type | Speed limit |
| --- | --- |
| Urban road without a road centerline | 30 |
| Highway without a road centerline | 40 |
| Urban road with only one lane for motor vehicles in the same direction | 50 |
| ... | ... |

The vehicle-mounted terminal determines, by using the navigation and positioning apparatus, a type of a current road on which the present vehicle runs, searches the foregoing correspondence table for a speed limit imposed by the current road type on the present vehicle, and determines the speed limit as the road-type-imposed speed limit on the present vehicle.

Based on the foregoing description, during vehicle running, only one case may be considered, or any multiple cases may be considered comprehensively. That is, the other speed limits may include one of or any combination of the foregoing speed limits.

In step 102, a comprehensive speed limit on the present vehicle is determined according to the speed limit imposed by the preceding vehicle on the present vehicle and the other speed limits.

The comprehensive speed limit is a final speed limit determined according to all the speed limits calculated based on all the cases.

Optionally, a minimum value in the speed limit imposed by the preceding vehicle on the present vehicle and the other speed limits is determined as the comprehensive speed limit on the present vehicle.

In implementation, after the speed limit imposed by the preceding vehicle on the present vehicle and all the other speed limits are calculated, the speed limit imposed by the preceding vehicle on the present vehicle is compared with all the other speed limits, to determine a minimum value, and the minimum value is determined as the comprehensive speed limit on the present vehicle. In different running cases, the other speed limits may include one of or any combination of a lane-imposed speed limit on the present vehicle, a corner-imposed speed limit on the present vehicle, and a road-type-imposed speed limit on the present vehicle.

Optionally, the comprehensive speed limit on the present vehicle may be determined according to the speed limit imposed by the preceding vehicle on the present vehicle and the other speed limits that are obtained above, as well as a preset third speed limit. Corresponding processing may be as follows: determining a minimum value among the speed limit imposed by the preceding vehicle on the present vehicle, the other speed limits, and the preset third speed limit as a maximum speed of the present vehicle.

The preset third speed limit may be a speed limit that is set by a driver according to requirements thereof. For example, when there is a baby or a pregnant woman on the vehicle, the driver may set the third speed limit to be 60 km/h, to further ensure the safety of the passenger.

In implementation, after the speed limit imposed by the preceding vehicle on the present vehicle, the other speed limits, and the preset third speed limit are determined, the speed limit imposed by the preceding vehicle on the present vehicle, the other speed limits, and the third speed limit are compared to determine a minimum value, and the minimum value is determined as the comprehensive speed limit on the present vehicle. In different running cases, the other speed limits may include one of or any combination of a lane-imposed speed limit on the present vehicle, a corner-imposed speed limit on the present vehicle, and a road-type-imposed speed limit on the present vehicle.

In step 103, driving is controlled based on the comprehensive speed limit. For example, a driving control signal may be generated by the computing device or a driving control unit for the present vehicle (e.g., to control the speed of the present vehicle by accelerating or braking).

In implementation, after the comprehensive speed limit is determined, the comprehensive speed limit is used as a basis for formulating an actual speed plan, so that during vehicle driving, the actual speed does not exceed the comprehensive speed limit.

Specifically, the disclosed method fully considers the common scenes in driving, meets the actual needs of autonomous or assisted driving and can handle more complicated combinations. It can reasonably control the maximum driving speed to change stably between different driving scenes, so the speed planning of the vehicle can be more stable, avoiding abnormal acceleration and deceleration, and ensuring driving safety.

Further, the disclosed method fully considers the need for speed control when following a preceding car. The speed limit imposed by the preceding car is fully integrated into the disclosed method to produce a stable car-following experience, and the planned driving speed is controlled as an "acceleration to constant speed" process or "deceleration to constant speed" process, which is safer and more reasonable, and is in line with human driving habits.

In addition, the disclosed method fully considers the need for speed control in lane changing scenarios to ensure that the speed is gradually accelerated or decelerated as needed, and that there is no abrupt braking immediately after the lane change.

In the embodiment of this application, factors taken into consideration are more comprehensive during calculation of a comprehensive speed limit, which is more applicable to complex situations during driving, so that driving safety is improved.

Figure 5:
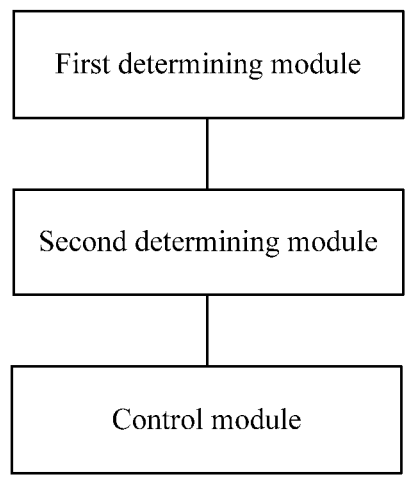
FIG. 5 is a schematic structural diagram of an apparatus for controlling vehicle driving according to an embodiment of this application.

Based on the same technical conception, an embodiment of this application further provides an apparatus for controlling vehicle driving. The apparatus may be the vehicle-mounted terminal in the foregoing embodiment. As shown in FIG. 5, the apparatus includes: a first determining module 510, a second determining module 520, and a control module 530.

The first determining module 510 is configured to determine, according to a speed of a preceding vehicle, a distance between a present vehicle and the preceding vehicle, and a preset expected collision time, a speed limit imposed by the preceding vehicle on the present vehicle, and determine other speed limits on the present vehicle according to road attribute information of a current location.

The second determining module 520 is configured to determine a comprehensive speed limit on the present vehicle according to the speed limit imposed by the preceding vehicle on the present vehicle and the other speed limits.

The control module 530 is configured to control driving based on the comprehensive speed limit.

Optionally, the other speed limits include one of or any combination of a lane-imposed speed limit on the present vehicle, a corner-imposed speed limit on the present vehicle, and a road-type-imposed speed limit on the present vehicle.

The first determining module 510 is configured to:
determine, in a case that the other speed limits include a lane-imposed speed limit on the present vehicle, a speed limit of a current lane as the lane-imposed speed limit on the present vehicle;
determine, in a case that the other speed limits include a corner-imposed speed limit on the present vehicle, the corner-imposed speed limit on the present vehicle according to a road curvature of the current location; and determine, in a case that the other speed limits include a road-type-imposed speed limit on the present vehicle, a road-type-imposed speed limit on the present vehicle according to a road type of the current location and a pre-stored correspondence between road types and speed limits.

Optionally, the first determining module 510 is configured to:
determine the speed limit of the current lane as the lane-imposed speed limit on the present vehicle in a case that the present vehicle does not have a lane change within preset duration before a current moment; and determine the speed limit of the current lane as the lane-imposed speed limit on the present vehicle in a case that the present vehicle has a lane change within the preset duration before the current moment and the speed limit of the current lane is not less than a speed limit of a lane before the lane change to the current lane.

Optionally, the first determining module 510 is configured to:
determine the speed limit of the current lane as the lane-imposed speed limit on the present vehicle in a case that the present vehicle does not have a lane change within the preset duration before the current moment and no lane changing instruction is received at the current moment.

Optionally, the first determining module 510 is configured to:
determine the speed limit of the current lane as the lane-imposed speed limit on the present vehicle in a case that the present vehicle does not have a lane change within the preset duration before the current moment, a lane changing instruction is received at the current moment, and the speed limit of the current lane is not less than a speed limit of a lane that the present vehicle is going to enter; or
determine a speed limit of a lane that the present vehicle is going to enter as the lane-imposed speed limit on the present vehicle in a case that the present vehicle does not have a lane change within the preset duration before the current moment, a lane changing instruction is received at the current moment, and the speed limit of the current lane is less than the speed limit of the lane that the present vehicle is going to enter.

Optionally, the first determining module 510 is configured to:
determine, in a case that the present vehicle has a lane change within preset duration before a current moment and a speed limit of a current lane is less than a speed limit of a lane before the lane change to the current lane, the speed limit of the lane before the lane change as the lane-imposed speed limit on the present vehicle.

Optionally, the first determining module 510 is configured to:
determine a first speed limit on the present vehicle according to the speed of the preceding vehicle, the distance between the present vehicle and the preceding vehicle, and the preset expected collision time;
determine a second speed of the present vehicle according to the speed of the preceding vehicle, the distance between the present vehicle and the preceding vehicle, a preset safe distance between the present vehicle and the preceding vehicle, preset driving duration required for adjusting the distance between the present vehicle and the preceding vehicle to be the safe distance, and a preset acceleration time;
determine a minimum value in the first speed limit and the second speed limit as the speed limit imposed by the preceding vehicle on the present vehicle, in a case that the speed of the preceding vehicle is not less than a speed of the present vehicle; and determine a maximum value in the first speed limit and the second speed limit as the speed limit imposed by the preceding vehicle on the present vehicle, in a case that the speed of the preceding vehicle is less than the speed of the present vehicle.

Optionally, the second determining module 520 is configured to determine a minimum value in the speed limit imposed by the preceding vehicle on the present vehicle and the other speed limits as the comprehensive speed limit on the present vehicle.

Optionally, the second determining module 520 is configured to:
determine a minimum value in the speed limit imposed by the preceding vehicle on the present vehicle, the other speed limits, and a preset third speed limit as the comprehensive speed limit on the present vehicle.

Specific manners of operations performed by the modules in the apparatus in the foregoing embodiment have been described in detail in the embodiment of the related method, and details are not illustrated herein again.

In the embodiment of this application, factors taken into consideration during calculation of a comprehensive speed limit include factors in multiple complex situations. Therefore, the calculated comprehensive speed limit is more applicable to complex situations during driving, so that driving safety is improved.

When the apparatus for controlling vehicle driving provided in the foregoing embodiment controls driving of a vehicle, the division of the foregoing functional modules is merely used as an example for description. In actual application, the foregoing functions may be allocated to and completed by different functional modules as required. That is, an internal structure of the device is divided into different functional modules, to complete all or some of the functions described above. In addition, the apparatus for controlling vehicle driving provided in the foregoing embodiment belongs to the same conception as the embodiment of the method for controlling vehicle driving. For a specific implementation process thereof, refer to the method embodiment, and details are not described herein again.

Figure 6:
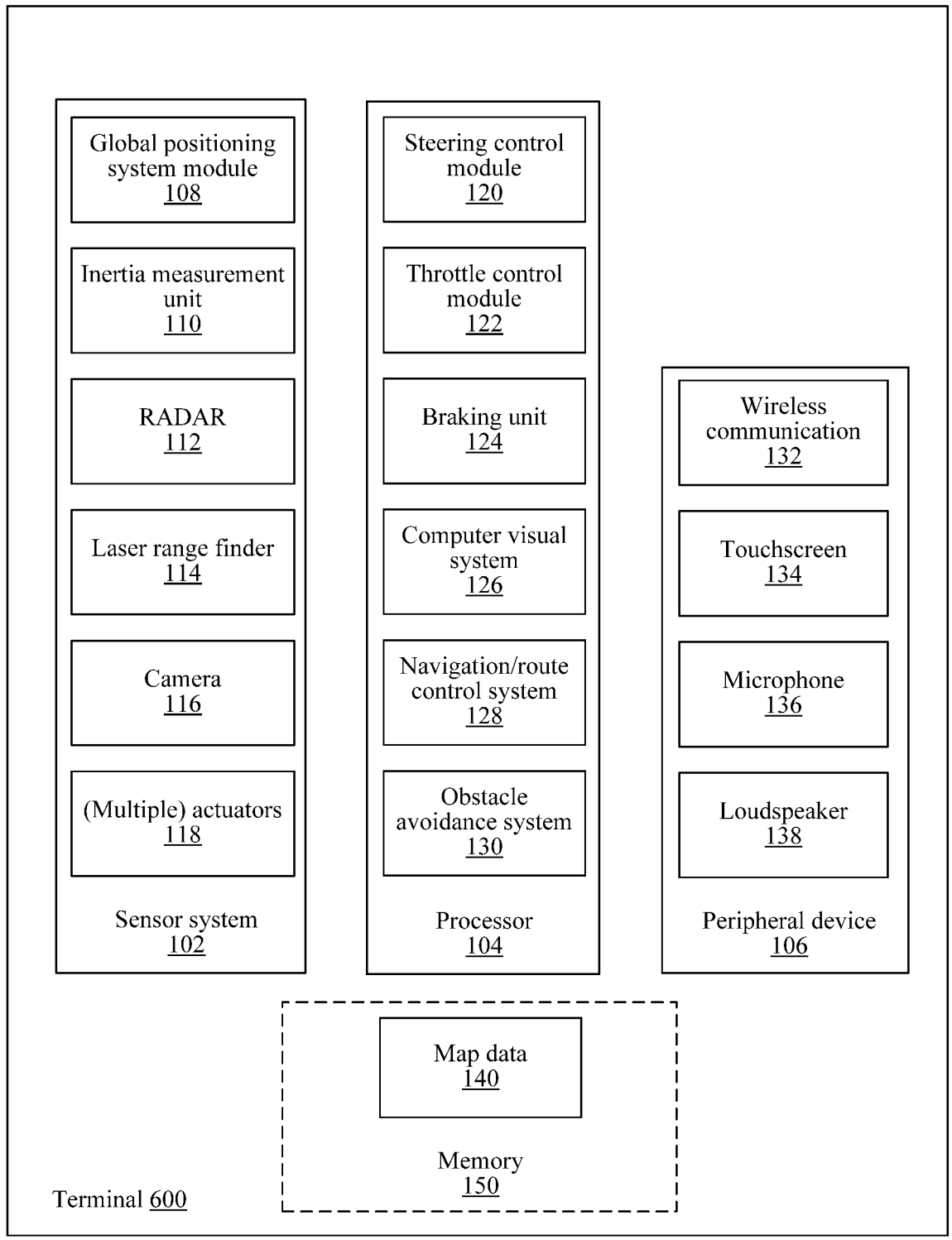
FIG. 6 is a schematic diagram of a terminal according to an embodiment of this application.

Refer to FIG. 6, which is a schematic structural diagram of a terminal related to an embodiment of this application. The terminal may be configured to implement the method for controlling vehicle driving provided in the foregoing embodiment. Specifically:

A terminal 600 may include components such as a sensor system 102, a processor 104, a peripheral device 106, and a memory 150. A person skilled in the art may understand that the terminal structure shown in FIG. 6 does not limit the terminal. The terminal 600 may include more or fewer components than those shown in FIG. 6, or some components may be combined, or a different component deployment may be used.

The sensor system 102 may be configured to measure required data. Specifically, the sensor system 102 may include a global positioning system module 108, an inertia measurement unit 110, radio detection and ranging (RADAR) 112, a laser range finder 114, a camera 116, and (multiple) actuators 118. The global positioning system module 108 may be configured to position and navigate a vehicle in real time globally. The inertia measurement unit 110 may be configured to measure a tri-axial attitude angle (or angular velocity) and an acceleration of the vehicle. The RADAR 112 may be configured to measure state parameters of the vehicle, such as a distance, an orientation, and a speed. The RADAR 112 may include an antenna, a transmitter, a receiver (including a signal processor), a display, and other parts. The laser range finder 114 may implement distance measurement for the vehicle by modulating a specific parameter of laser. The camera 116 may be configured to obtain an image of a current road condition. The (multiple) actuators 118 may convert a rotation movement of a vehicle motor to a linear movement of a push rod. Other sensors that can be configured on the terminal 600, such as a gyroscope, a barometer, a hygrometer, a thermometer, and an infrared sensor, are not described in detail herein.

The processor 104 is a control center of the terminal 600, and connects to various parts of the vehicle by using various interfaces and lines. By running or executing software programs and/or modules stored in the memory 150, and invoking data stored in the memory 150, the processor 104 performs various functions and data processing of the terminal 600, thereby performing overall monitoring on the vehicle. Specifically, the processor 104 may include a steering control module 120, a throttle control module 122, a braking unit 124, a computer visual system 126, a navigation/route control system 128, an obstacle avoidance system 130, and map data 132. The steering control module 120 may be configured to instruct the vehicle to steer. The throttle control module 122 may be configured to instruct the vehicle to accelerate. The braking unit 124 may be configured to instruct the vehicle to lower the speed or stop. The computer visual system 126 may be configured to display various parameters of the vehicle. The navigation/route control system 128 may be configured to indicate a condition of a current road on which the vehicle is running. The obstacle avoidance system 130 may be configured to instruct the vehicle to avoid obstacles on a current running route, and change and adjust the running route appropriately. Optionally, the processor 104 may include one or more cores. Preferably, the processor 104 may integrate an application processor and a modem processor. The application processor mainly processes an operating system and the like. The modem processor mainly processes wireless communication. It can be appreciated that, the modem processor may not be integrated into the processor 104.

The peripheral device 106 may include wireless communication 132, a touchscreen 134, a microphone 136, and a loudspeaker 138. The wireless communication 132 mainly includes microwave communication and satellite communication, and may exchange information by using such a characteristic that an electromagnetic signal can propagate in a free space. The touchscreen 134 may be configured to display related parameters of the vehicle, a road condition, and other information, and receive a touch signal of a user, so as to implement a corresponding function. The microphone 136 and the loudspeaker 138 may provide an audio interface between the user and the terminal 600. An audio circuit may transmit an electric signal, which is converted from received audio data, to the loudspeaker 138. The loudspeaker 138 converts the electric signal into a sound signal, and outputs the sound signal. On the other hand, the microphone 136 converts a collected sound signal into an electric signal. The audio circuit receives the electric signal and converts the electric signal into audio data. The audio data is then output to the processor 104 for processing and then sent to, for example, another terminal through an RF circuit, or the audio data is output to the memory 150 for further processing.

The memory 150 may be configured to store instructions and data related to vehicle control. Particularly, the memory 150 may include the map data 140. The map data 140 may be configured to indicate map routes near the vehicle and related data.

Although not shown in the figure, the terminal 600 may further include a camera, a Bluetooth module, and the like, which are not further described herein. Specifically, in some embodiments, the terminal 600 further includes a memory and one or more programs. The one or more programs are stored in the memory and configured to be executed by one or more processors, so as to implement the method for controlling vehicle driving according to the foregoing embodiments.

An embodiment of this application further provides a computer readable storage medium. The storage medium stores at least one instruction, at least one program segment, a code set, or an instruction set; the at least one instruction, the at least one program segment, the code set, or the instruction set is loaded by the processor to implement the foregoing method for controlling vehicle driving.

A person of ordinary skill in the art may understand that all or some of the steps of the foregoing embodiments may be implemented by hardware, or may be implemented by a program instructing relevant hardware. The program may be stored in a computer readable storage medium. The storage medium may be a read-only memory, a magnetic disk, an optical disc, or the like.

The foregoing descriptions are merely preferred embodiments of this application, but are not intended to limit this application. Any modification, equivalent replacement, or improvement made within the spirit and principle of this application shall fall within the protection scope of this application.

What is claimed is:

1. A method for controlling vehicle driving, applied by a computing device, comprising:
   determining a first speed limit on a present vehicle according to a speed of a preceding vehicle, a distance between the present vehicle and the preceding vehicle, and a preset expected collision time;

determining a second speed limit of the present vehicle according to the speed of the preceding vehicle, the distance between the present vehicle and the preceding vehicle, a safe distance between the present vehicle and the preceding vehicle, a preset driving duration required for adjusting the distance between the present vehicle and the preceding vehicle to the safe distance, and a preset acceleration time;

determining a minimum value between the first speed limit and the second speed limit as a speed limit imposed by the preceding vehicle on the present vehicle, when the speed of the preceding vehicle is not less than a speed of the present vehicle;

determining a maximum value between the first speed limit and the second speed limit as the speed limit imposed by the preceding vehicle on the present vehicle, when the speed of the preceding vehicle is less than the speed of the present vehicle;

determining, a road-condition-related speed limit on the present vehicle according to road attribute information of a current location of the present vehicle;

determining, a comprehensive speed limit on the present vehicle according to the speed limit imposed by the preceding vehicle on the present vehicle and the road-condition-related speed limit; and generating, a driving control signal for the present vehicle based on the comprehensive speed limit.

2. The method according to claim 1, wherein the road-condition-related speed limit comprises one of or any combination of a lane-imposed speed limit on the present vehicle, a corner-imposed speed limit on the present vehicle, and a road-type-imposed speed limit on the present vehicle.

3. The method according to claim 1, wherein the road-condition-related speed limit comprise a lane-imposed speed limit on the present vehicle, and determining the road-condition-related speed limit on the present vehicle comprises: determining a speed limit of a current lane as the lane-imposed speed limit on the present vehicle.

4. The method according to claim 1, wherein the road-condition-related speed limit comprise a corner-imposed speed limit on the present vehicle, and determining the road-condition-related speed limit on the present vehicle comprises: determining the corner-imposed speed limit on the present vehicle according to a road curvature of the current location.

5. The method according to claim 1, wherein the road-condition-related speed limit comprise a road-type-imposed speed limit on the present vehicle, and determining the road-condition-related speed limit on the present vehicle comprises: determining the road-type-imposed speed limit on the present vehicle according to a road type of the current location and a pre-stored correspondence between road types and speed limits.

6. The method according to claim 3, wherein determining the speed limit of the current lane as the lane-imposed speed limit on the present vehicle comprises:

determining the speed limit of the current lane as the lane-imposed speed limit on the present vehicle when the present vehicle has not changed lane within a preset duration before a current moment; and determining the speed limit of the current lane as the lane-imposed speed limit on the present vehicle when the present vehicle has changed from a previous lane to the current lane within the preset duration before the current moment and the speed limit of the current lane is not less than a speed limit of the previous lane.

7. The method according to claim 6, wherein determining the speed limit of the current lane as the lane-imposed speed limit on the present vehicle when the present vehicle has not changed lane within the preset duration before the current moment comprises:

determining the speed limit of the current lane as the lane-imposed speed limit on the present vehicle when the present vehicle has not changed lane within the preset duration before the current moment and no lane changing instruction is received at the current moment.

8. The method according to claim 6, further comprising:

determining the speed limit of the current lane as the lane-imposed speed limit on the present vehicle when the present vehicle has not changed lane within the preset duration before the current moment, a lane changing instruction is received at the current moment, and the speed limit of the current lane is not less than a speed limit of a lane that the present vehicle is going to enter; and determining the speed limit of the lane that the present vehicle is going to enter as the lane-imposed speed limit on the present vehicle when the present vehicle has not changed lane within the preset duration before the current moment, a lane changing instruction is received at the current moment, and the speed limit of the current lane is less than the speed limit of the lane that the present vehicle is going to enter.

9. The method according to claim 1, further comprising:

determining, when the present vehicle has changed from a previous lane to a current lane within preset duration before a current moment and a speed limit of the current lane is less than a speed limit of the previous lane, the speed limit of the previous lane as the lane-imposed speed limit on the present vehicle.

10. The method according to claim 1, wherein determining the comprehensive speed limit on the present vehicle comprises:

determining a minimum value in the speed limit imposed by the preceding vehicle on the present vehicle and the road-condition-related speed limit as the comprehensive speed limit on the present vehicle.

11. The method according to claim 1, wherein determining the comprehensive speed limit on the present vehicle comprises:

determining a minimum value among the speed limit imposed by the preceding vehicle on the present vehicle, the road-condition-related speed limit, and a preset third speed limit as the comprehensive speed limit on the present vehicle.

12. A terminal, comprising a memory and a processor, the processor being configured to:

determine a first speed limit on a present vehicle according to a speed of a preceding vehicle, a distance between the present vehicle and the preceding vehicle, and a preset expected collision time;

determine a second speed limit of the present vehicle according to the speed of the preceding vehicle, the distance between the present vehicle and the preceding vehicle, a safe distance between the present vehicle and the preceding vehicle, a preset driving duration required for adjusting the distance between the present vehicle and the preceding vehicle to the safe distance, and a preset acceleration time;

determine a minimum value between the first speed limit and the second speed limit as a speed limit imposed by the preceding vehicle on the present vehicle, when the speed of the preceding vehicle is not less than a speed of the present vehicle;

determine a maximum value between the first speed limit and the second speed limit as the speed limit imposed by the preceding vehicle on the present vehicle, when the speed of the preceding vehicle is less than the speed of the present vehicle;

determine a road-condition-related speed limit on the present vehicle according to road attribute information of a current location of the present vehicle; and determine a comprehensive speed limit on the present vehicle according to the speed limit imposed by the preceding vehicle on the present vehicle and the road-condition-related speed limit; and generate a driving control signal for the present vehicle based on the comprehensive speed limit.

13. The terminal according to claim 12, wherein the road-condition-related speed limit comprise a lane-imposed speed limit on the present vehicle, and determining the road-condition-related speed limit on the present vehicle comprises: determining a speed limit of a current lane as the lane-imposed speed limit on the present vehicle.

14. The terminal according to claim 13, wherein determining the speed limit of the current lane as the lane-imposed speed limit on the present vehicle comprises:

determining the speed limit of the current lane as the lane-imposed speed limit on the present vehicle when the present vehicle has not changed lane within a preset duration before a current moment; and determining the speed limit of the current lane as the lane-imposed speed limit on the present vehicle when the present vehicle has changed from a previous lane to the current lane within the preset duration before the current moment and the speed limit of the current lane is not less than a speed limit of the previous lane.

15. The terminal according to claim 14, wherein determining the speed limit of the current lane as the lane-imposed speed limit on the present vehicle when the present vehicle has not changed lane within the preset duration before the current moment comprises:

determining the speed limit of the current lane as the lane-imposed speed limit on the present vehicle when the present vehicle has not changed lane within the preset duration before the current moment and no lane changing instruction is received at the current moment.

16. The terminal according to claim 14, wherein the processor is further configured to:

determine the speed limit of the current lane as the lane-imposed speed limit on the present vehicle when the present vehicle has not changed lane within the preset duration before the current moment, a lane changing instruction is received at the current moment, and the speed limit of the current lane is not less than a speed limit of a lane that the present vehicle is going to enter; and determine the speed limit of the lane that the present vehicle is going to enter as the lane-imposed speed limit on the present vehicle when the present vehicle has not changed lane within the preset duration before the current moment, a lane changing instruction is received at the current moment, and the speed limit of the current lane is less than the speed limit of the lane that the present vehicle is going to enter.

17. The terminal according to claim 12, wherein the processor is further configured to:

determining, when the present vehicle has changed from a previous lane to a current lane within preset duration before a current moment and a speed limit of the current lane is less than a speed limit of the previous lane, the speed limit of the previous lane as the lane-imposed speed limit on the present vehicle.

18. A non-transitory computer readable storage medium, storing at least one instruction, at least one program segment, a code set, or an instruction set, and the at least one instruction, the at least one program segment, the code set, or the instruction set being loaded and executed by a processor to implement:

determining a first speed limit on a present vehicle according to a speed of a preceding vehicle, a distance between the present vehicle and the preceding vehicle, and a preset expected collision time;

determining a second speed limit of the present vehicle according to the speed of the preceding vehicle, the distance between the present vehicle and the preceding vehicle, a safe distance between the present vehicle and the preceding vehicle, a preset driving duration required for adjusting the distance between the present vehicle and the preceding vehicle to the safe distance, and a preset acceleration time;

determining a minimum value between the first speed limit and the second speed limit as a speed limit imposed by the preceding vehicle on the present vehicle, when the speed of the preceding vehicle is not less than a speed of the present vehicle;

determining a maximum value between the first speed limit and the second speed limit as the speed limit imposed by the preceding vehicle on the present vehicle, when the speed of the preceding vehicle is less than the speed of the present vehicle;

determining a road-condition-related speed limit on the present vehicle according to road attribute information of a current location of the present vehicle;

determining a comprehensive speed limit on the present vehicle according to the speed limit imposed by the preceding vehicle on the present vehicle and the road-condition-related speed limit; and generating a driving control signal for the present vehicle based on the comprehensive speed limit.

* * * * *